J. REAGAN.
BOILER AND OTHER FURNACE.
APPLICATION FILED MAY 17, 1915. RENEWED DEC. 4, 1916.
1,211,755.
Patented Jan. 9, 1917.
6 SHEETS—SHEET 4.
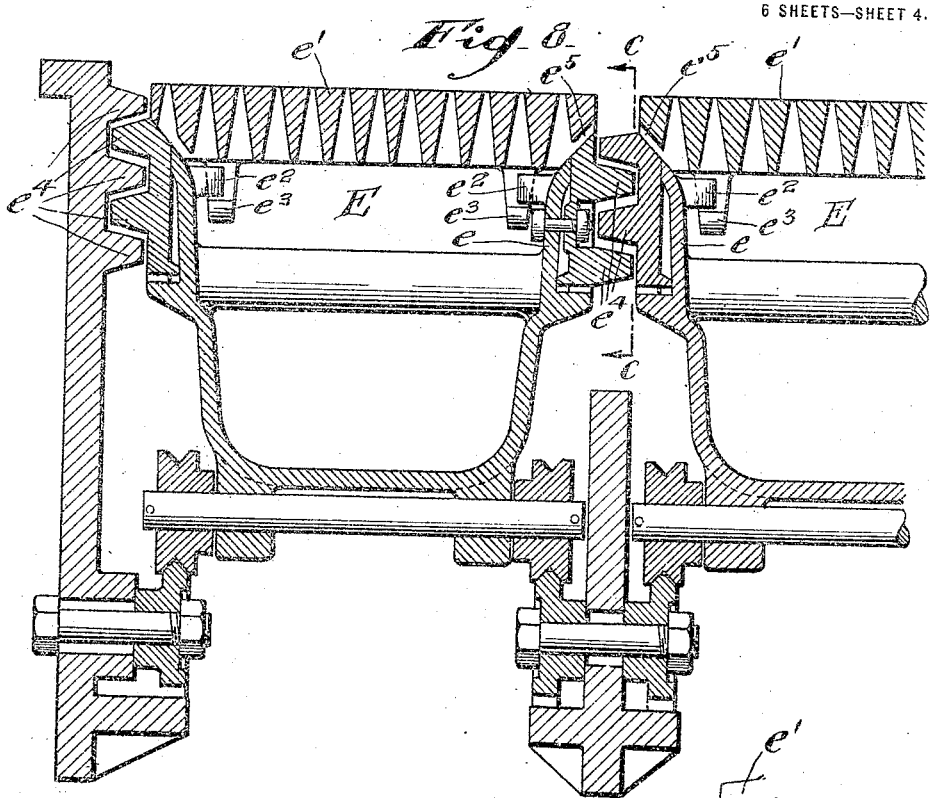
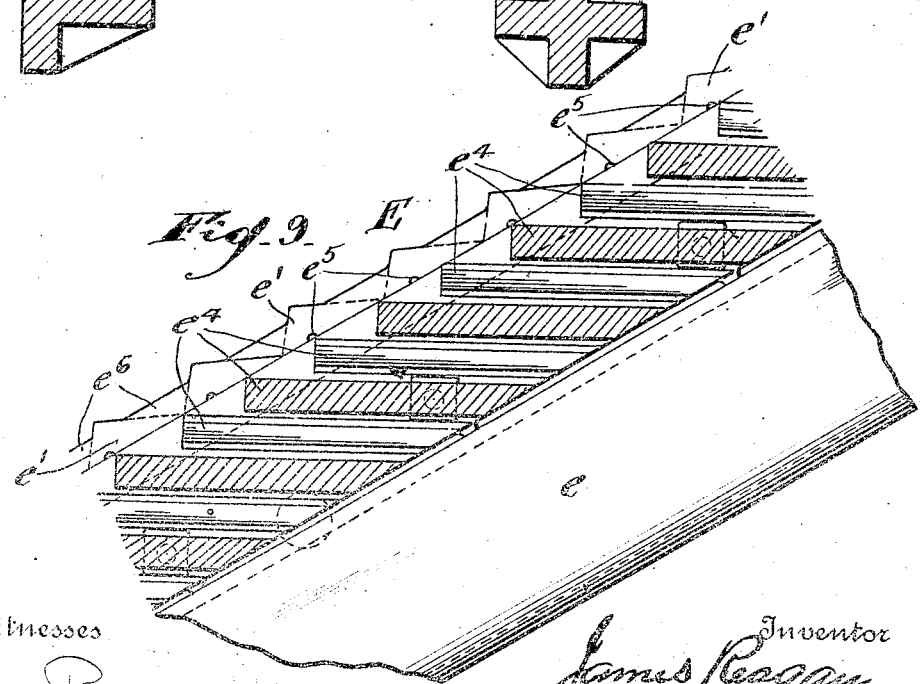

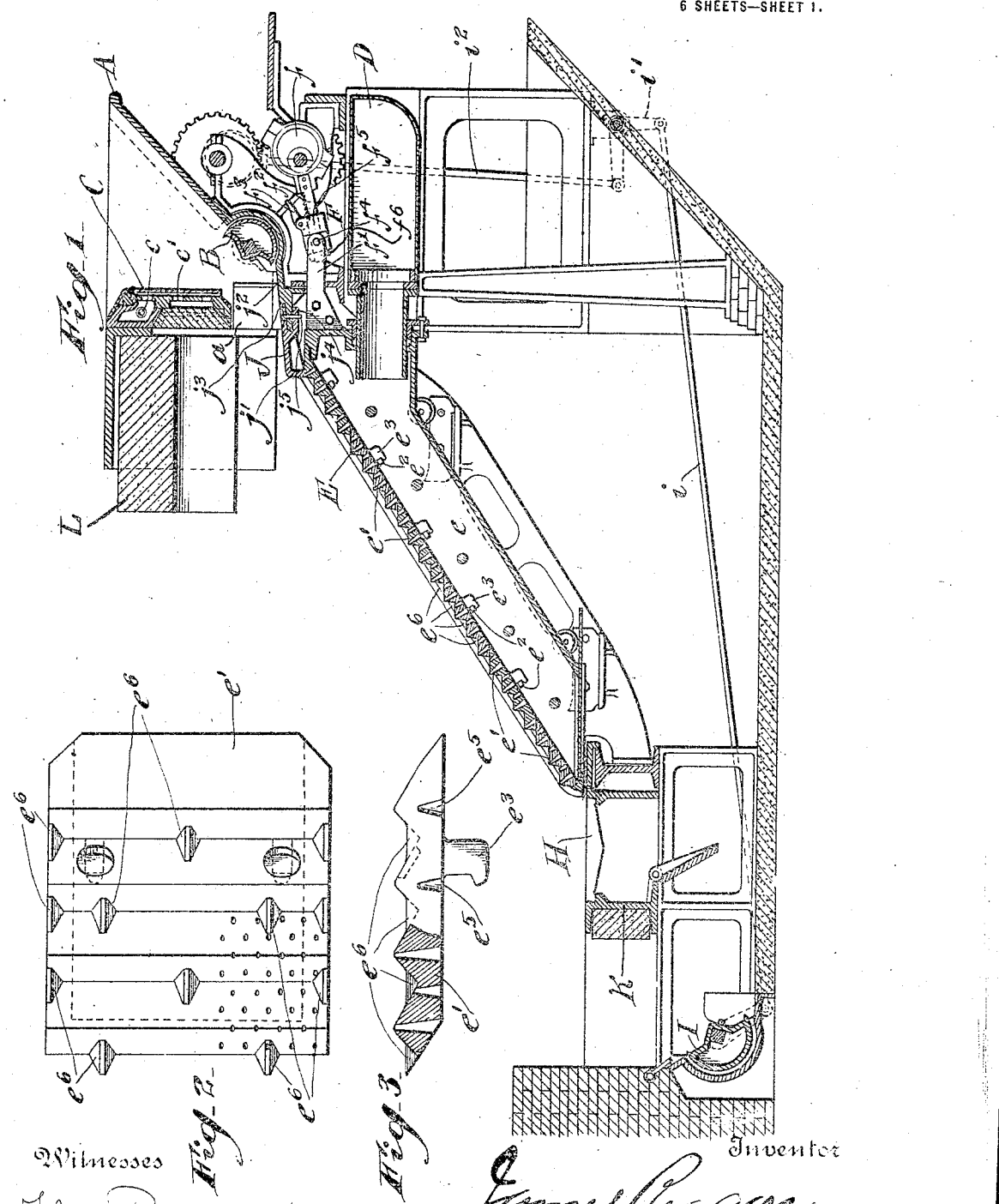

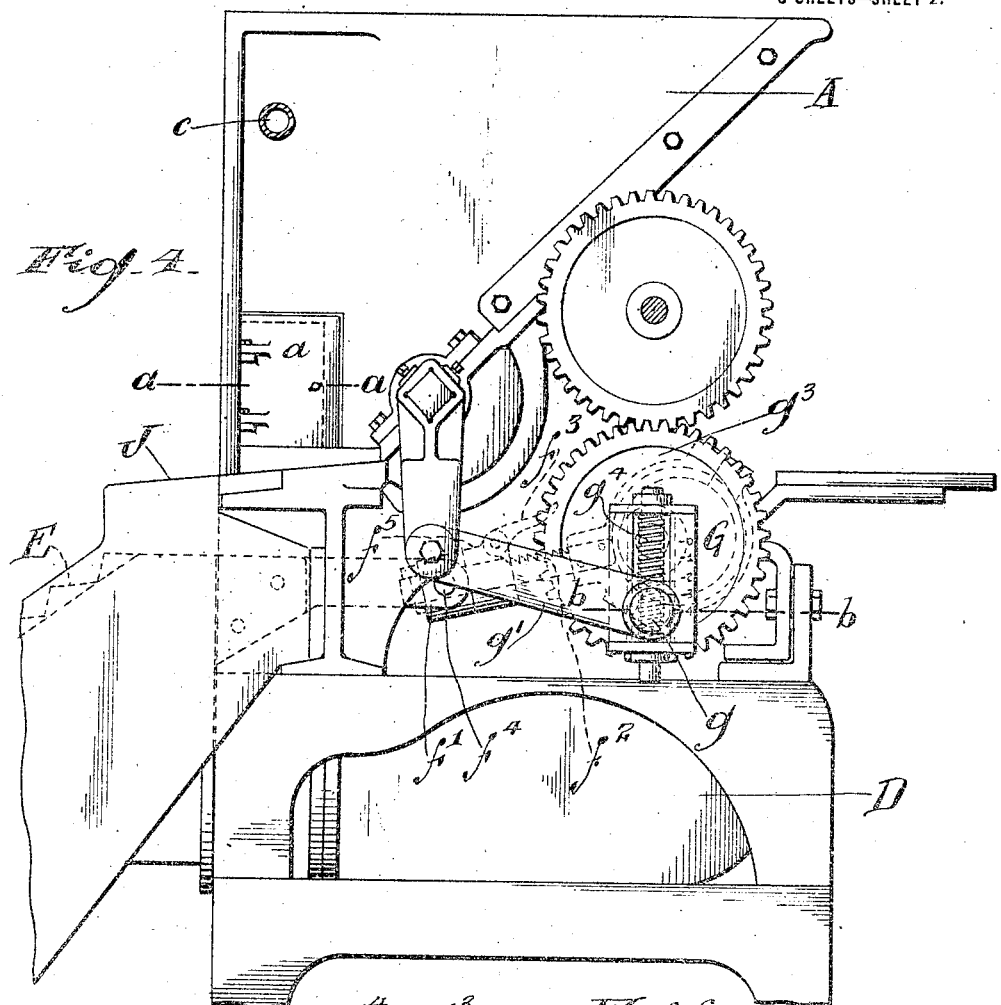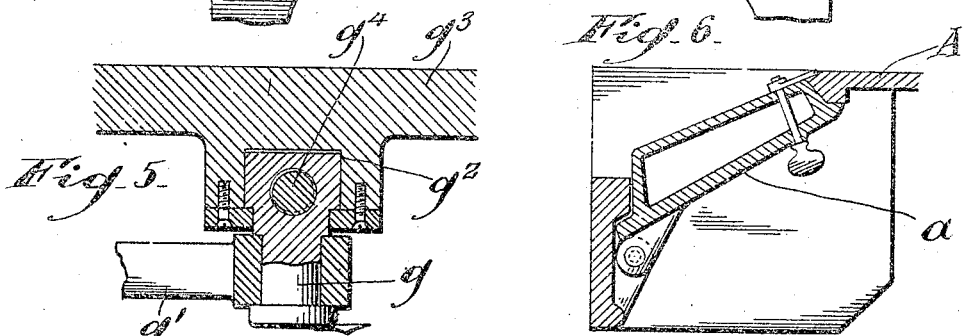

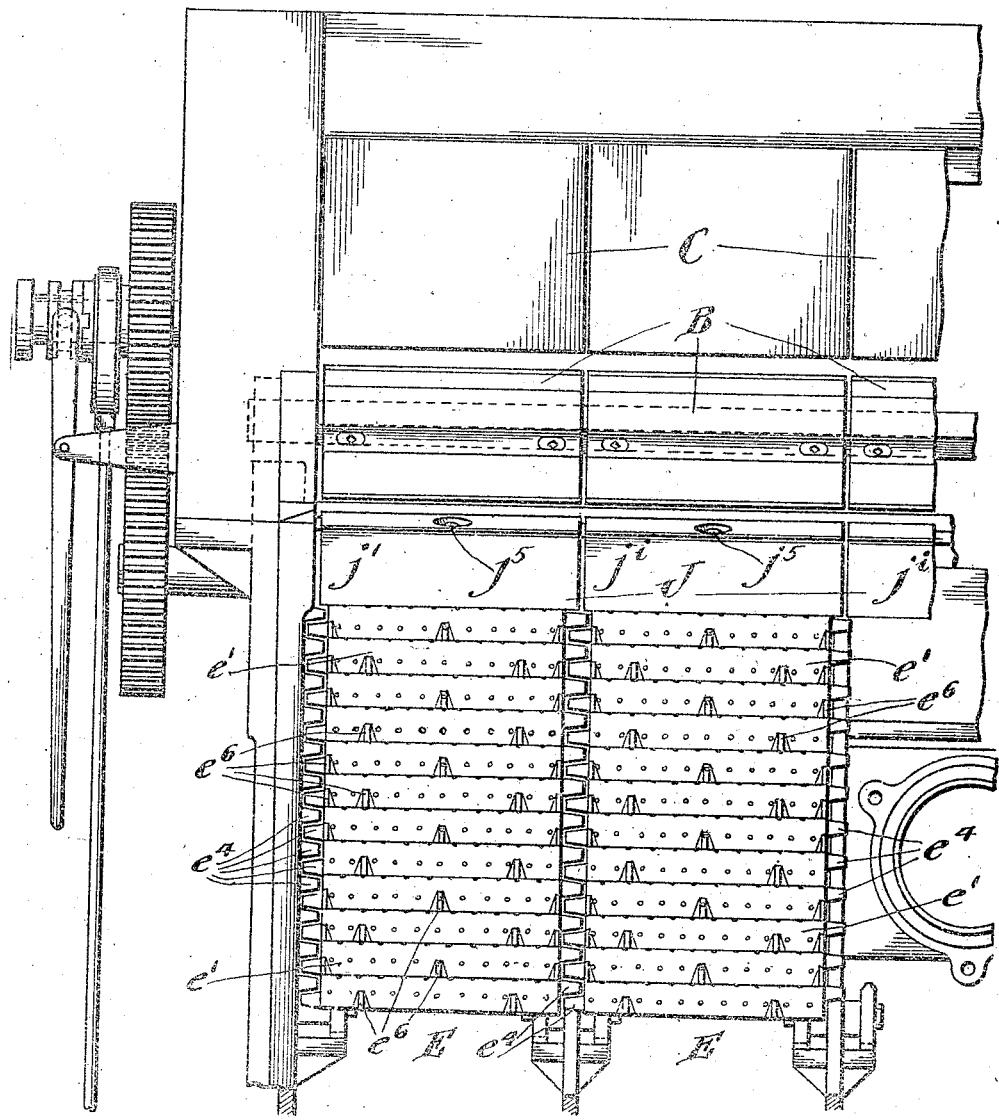

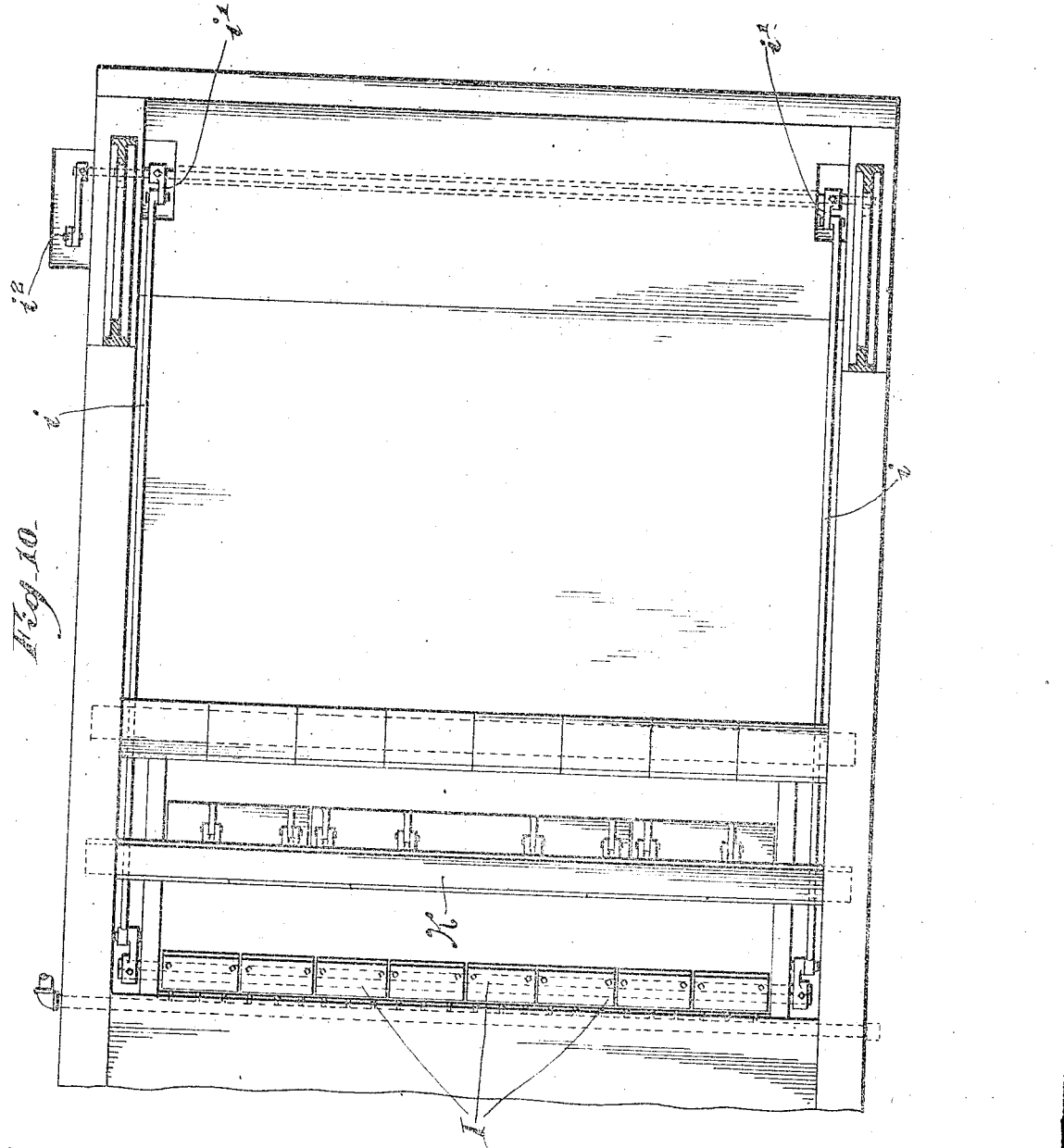

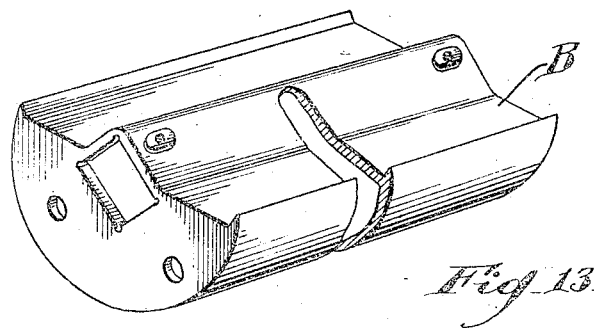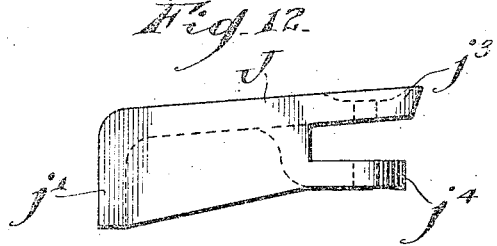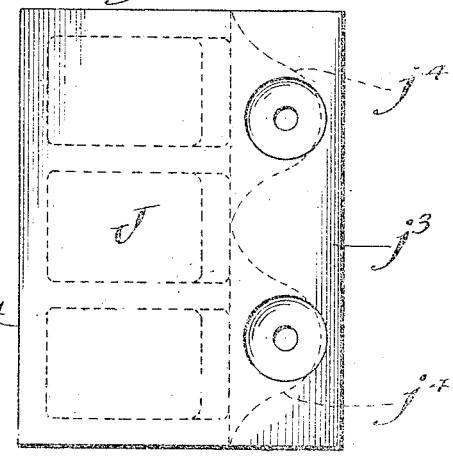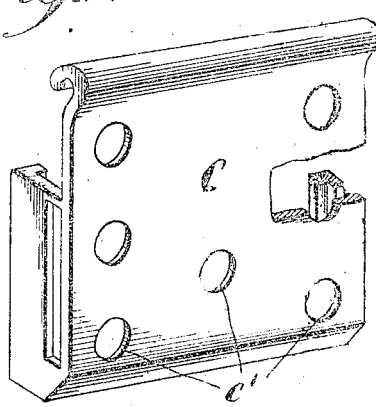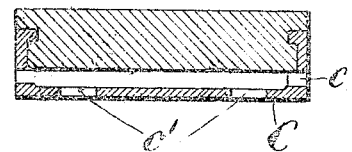

UNITED STATES PATENT OFFICE.

JAMES REAGAN, OF PHILADELPHIA, PENNSYLVANIA.

BOILER AND OTHER FURNACE.

1,211,755.             Specification of Letters Patent.      Patented Jan. 9, 1917.

Application filed May 17, 1915, Serial No. 28,742. Renewed December 4, 1916. Serial No. 134,809.

*To all whom it may concern:*

Be it known that I, JAMES REAGAN, a citizen of the United States, residing at Philadelphia, in the county of Philadelphia and State of Pennsylvania, have invented certain new and useful Improvements in Boiler and other Furnaces, of which the following is a specification.

My invention relates to boiler and other furnaces, and it is an improvement on the invention revealed in my pending application, Serial #859,070, filed August 28, 1914.

It consists of means for rendering certain the disruption of the fuel as it passes from the fuel feeder to the grate on which the solid fuel is consumed, so that the radiant heat of the igneous gases in the furnace will reach the greater portion of the fuel before it is fed to the final zone of combustion. This certainty of operation is attained by the use of a step that is disposed between the fuel feeder and the grate, the effect being to not only disturb the rather compact body of fuel by a change in direction of its flow, but to disturb it by a precipitate change of altitude under the influence of gravity, or by some other disturbing factor which will cause the said fuel to open up at the proper place so the smaller or minute portions of it will be subjected to the heat of the furnace and be destructively distilled.

The invention also relates to a modified means for supplying crossing jets of air under a forced draft to a part of the combustion zone.

Other features of the invention will be apparent.

In the drawings—Figure 1 is a vertical longitudinal section of the entire furnace; Figs. 2 and 3 are detail views showing construction of the step-plate section of the grate bars; Fig. 4 is a side elevation of the feed hopper showing the actuating mechanism for the fuel feeder and the grate bars; Fig. 5 is a section through the adjusting mechanism for the feeder on the line $b$—$b$, Fig. 4; Fig. 6 is a section through a portion of the fuel hopper on the line $a$—$a$, Fig. 4; Fig. 7 is a plan view showing hopper and grate sections; Fig. 8 is a transverse sectional view of the grate and its supporting devices; Fig. 9 is a vertical section or part of the grate on the line $c$—$c$, Fig. 8; Fig. 10 is a partial plan view showing the ash pusher at the rear of the grate and its relation to adjacent parts of the furnace; Fig. 11 is a perspective view of the oscillator; Figs. 12 and 13 are views showing separated parts of the head block; Figs. 14 and 15 are views showing details of the hopper door.

A is the hopper, B the fuel feeder, C the hopper door, D is the air box, E the grate, F the adjustable driving mechanism for the grate bars, G is the adjustable operative mechanism for the fuel feeder, H the rest grate, I the ash pusher, J the head block, and K is the bottom supporting beam.

The hopper, the fuel feeder, the hopper door, the air box, the movable grate, the rest grate, and the bottom supporting beam are constructed and related to each other in about the same way as in my application, Serial #859,070, filed August 28, 1914. The hopper door is, however, of somewhat different construction, the same being not only brick-lined but provided with ventilative passages, $c$, $c'$, for air.

The hopper A is provided with a door $a$, as shown in Fig. 6, said door being disposed at such angle relative to the furnace as to admit of the introduction of a stoking implement. In the present construction the body $e$ and the perforated step-plate sections $e'$ of each grate bar E are united by interlocking lugs $e^2$, $e^3$ as shown. The interlocking teeth $e^4$ in the present construction are made separate from the body portion of the grate bar and are longer than in the previous construction. They are secured to the body portion by bolts. The grate sections are also provided with angularly disposed air openings or recesses $e^5$ through which crossed jets of air under forced draft are emitted. Some air under pressure is used instead of air under a natural draft so as to compensate for the obstructive effect of the more extensive interlocking teeth. Constructed in this way the interlocking teeth are not liable to be burned out, but if injured by the heat may be easily removed and replaced by others. Strengthening lugs $e^6$ are disposed in the angles of the step-plates.

The driving mechanism consists of an eccentric $f$, a driven member $f'$ that is attached to a grate section, and a notched bar $f^2$ carrying an adjusting nut $f^6$ and with which a pawl $f^3$ engages, the pawl being connected with part $f'$ by a trunnion $f^4$ carried by the hollow block $f^5$ upon which the pawl is mounted. By means of this construction the reciprocations of the grate may be varied.

The adjustable device G for driving the coal feeder consists of a headed crank-pin $g$ extending through the link $g'$. This crank-pin is mounted for adjustment in a groove $g^2$ that is associated with the gear $g^3$. A screw $g^4$ effects the radial adjustment of the crank-pin so as to vary the oscillations of the fuel feeder. The aforesaid devices are driven by any suitable train of mechanism.

The ash pusher I is an oscillatory device similar in character to the fuel feeder and is operated by rod $i$, a bell crank $i'$, and a link $i^2$ that is connected with the general driving mechanism of the furnace. This ash pusher feeds the clinker and ashes in the direction of the front of the furnace and besides this, operates in conjunction with the rest grate support K to fractionate the clinkers.

The head block J is provided with a flange $j'$ that produces a step between it and the grate over which the fuel may fall. The head block is secured to the frame $j^2$ by a flange $j^3$ and fingers $j^4$ through which end of the frame bolts $j^5$ extend.

The furnace may also have a heat absorbing and radiating wall L.

In the operation of the furnace the fuel passes from the hopper in measured quantities, is forced over the head block in a slowly moving and undisturbed layer, and thence passes to the grate on which the solid constituents are consumed. The layer of fuel is gently disrupted or opened up as it passes onto the grate, this function being performed by the drop at that point caused by the rather pronounced step produced by the flange $j'$ of the head block. The fuel being thus disturbed, substantially all parts thereof are subjected to the action of the radiant heat emanating from the burning gases of the furnace at a time when said fuel, by virtue of its gradual preliminary heating while passing to the head block, is in condition for destructive distillation, which, however, is volumetrically restricted by the smallness of the zone in which it is occurring, this zone being disposed mainly in vicinity of the step $j'$. The result is that, while the distillation is substantially perfected at this point, the volume of gases evolved is only such as comports with the natural capacity of the furnace as a consumer of gaseous fuel constituents. I am thus enabled not only to perfect the coking process, but to consume in the furnace the volatile constituents of bituminous fuel without production of smoke. The process is generally the same as that produced in the furnace shown in my earlier application above mentioned, in which however, the means for disrupting the body of fuel at the head of the grate is produced by a mere difference in the angular relation of the head block and the grate.

Having thus fully described my invention what I claim is—

1. A furnace having in combination a fuel feeder delivering to a coking zone and a movable grate of a different declination, including means for supplying air to the fuel, the fuel feeding means being so related to the grate as to admit of a disruption of the body of the fuel as it passes to the grate and stationary means for supporting the fuel moving through the coking zone and delivering directly to the grate, whereby disruption of the body of fuel will be localized and destructive distillation thereof, controlled.

2. A furnace having in combination a fuel feeder delivering to a coking zone and a movable grate of a different declination, including means for supplying substantially equal increments of air to the fuel, the fuel feeding means being so related to the grate as to admit of a disruption of the body of the fuel as it passes to the grate and stationary means for supporting the fuel moving through the coking zone and delivering directly to the grate, whereby disruption of the body of fuel will be localized and destructive distillation thereof, controlled.

3. A furnace having in combination a fuel feeder delivering to a coking zone and a movable grate, including means for admitting air to the fuel, said grate having a declination different from that of the feeder and arranged in stepped relation to said feeder and stationary means for supporting the fuel moving through the coking zone and delivering directly to the grate, whereby disruption of the body of fuel will be localized and destructive distillation thereof, controlled.

4. The combination of a furnace and a fuel feeder and a grate, the grate having hollow and movable air feeding sections, and means for supplying air between said sections, the several sections having air openings for directing intersecting streams of air into the fire zone.

5. The combination of a furnace, a fuel feeder, and a grate, the grate having hollow and movable air feeding sections provided with intermeshing lugs therebetween and means for supplying air between said sections, the several sections having air openings for directing intersecting streams of air into the fire zone.

6. The combination with a grate having adjacent hollow bars, of removable interlocking spaced teeth secured to said bars, the said bars being provided with air passages converging with respect to one another for feeding air across the space between the bars.

7. The combination with a reciprocatory inclined grate having means for uniformly supplying to fuel resting thereon, suitable quantities of air, of a fuel feeder, a stationary head block that is provided with a downwardly extending flange coöperating with the upper end of the grate, the construction including a coking zone in which the formation of gases occurs principally at the area disposed along the line of said flange.

8. The combination of a furnace having a coking zone, an inclined grate, a fuel feeder delivering to the coking zone and a stationary fuel support delivering directly to the upper end of the grate, the parts being arranged to disrupt the fuel as it passes to the grate only along a line or narrow zone extending across the furnace at the upper end of the grate, whereby a large portion thereof is exposed to the radiant heat of the furnace within a very limited area.

9. The combination of a furnace having a coking zone and a heat absorbing and radiating wall, an inclined grate, a fuel feeder delivering to the coking zone and a stationary fuel support delivering directly to the upper end of the grate, the parts being arranged to disrupt the fuel as it passes to the grate only along a line or narrow zone extending across the furnace at the upper end of the grate, whereby a large portion thereof is exposed to the radiant heat from said wall within a very limited area.

10. In a furnace, a coking zone, means for feeding fuel to the coking zone, an inclined grate so arranged relatively to the coking zone as to disrupt the fuel as it passes to the grate, said grate comprising movable hollow bars formed to direct converging streams of air into the disrupted fuel over the spaces between said bars.

In testimony whereof I affix my signature in the presence of two witnesses.

JAMES REAGAN.

Witnesses:
Geo. S. Henderson,
J. W. Cassidy.